(12) United States Patent
Friedrich

(10) Patent No.: US 9,197,341 B2
(45) Date of Patent: *Nov. 24, 2015

(54) METHOD, APPARATUS, AND LOGIC FOR WIRELESS DATA TRANSMISSION

(71) Applicant: Atmel Corporation, San Jose, CA (US)

(72) Inventor: Ulrich Friedrich, Ellhofen (DE)

(73) Assignee: Atmel Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/047,923

(22) Filed: Oct. 7, 2013

(65) Prior Publication Data

US 2014/0036902 A1 Feb. 6, 2014

Related U.S. Application Data

(63) Continuation of application No. 13/042,146, filed on Mar. 7, 2011, now Pat. No. 8,553,674, and a continuation of application No. 11/104,435, filed on Apr. 13, 2005, now abandoned.

(30) Foreign Application Priority Data

Apr. 14, 2004 (DE) .......................... 10 2004 019 309

(51) Int. Cl.
  *H04J 3/24* (2006.01)
  *H04J 3/14* (2006.01)
  *G06K 7/00* (2006.01)
(52) U.S. Cl.
  CPC ................. *H04J 3/14* (2013.01); *G06K 7/0008* (2013.01)

(58) Field of Classification Search
  CPC ....... H04W 28/06; H04W 80/04; H04W 8/26; H04W 28/04; H04L 29/06; H04L 47/10; H04L 47/36
  USPC ................. 370/277, 311, 345, 349, 470–472; 455/41.2, 41.3; 340/10.1, 10.3
  See application file for complete search history.

(56) References Cited

U.S. PATENT DOCUMENTS

| | | |
|---|---|---|
| 5,621,412 A | 4/1997 | Sharpe et al. |
| 5,646,607 A | 7/1997 | Schürmann et al. |
| 5,884,171 A | 3/1999 | Tanabe et al. |
| 6,172,609 B1 | 1/2001 | Lu et al. |

(Continued)

FOREIGN PATENT DOCUMENTS

| | | |
|---|---|---|
| DE | 101 38 217 A1 | 3/2003 |
| DE | 102 04 347 A1 | 8/2003 |

OTHER PUBLICATIONS

U.S. Appl. No. 11/104,435 Non-final rejection mailed Jan. 25, 2007.

(Continued)

*Primary Examiner* — Nhan Le
(74) *Attorney, Agent, or Firm* — Fish & Richardson P.C.

(57) ABSTRACT

In certain embodiments, a method comprises receiving a data transmission comprising a header with a symbol and at least one symbol delimiter. The method may comprise monitoring the received data transmission to determine whether a time period between successive symbol delimiters of the header exceeds a maximum time. The method may comprise resetting a transponder to an initial state if the time period exceeds the maximum time. The maximum time may be determined based at least in part on the symbol after receiving successive symbol delimiters.

20 Claims, 1 Drawing Sheet

(56) References Cited

U.S. PATENT DOCUMENTS

| | | | |
|---|---|---|---|
| 6,222,440 B1 | 4/2001 | Heller | |
| 8,553,674 B2 | 10/2013 | Friedrich | |
| 2001/0019303 A1 | 9/2001 | Bruhnke et al. | |
| 2003/0007504 A1 | 1/2003 | Berry et al. | |
| 2003/0025598 A1 | 2/2003 | Wolf et al. | |
| 2003/0133435 A1 | 7/2003 | Friedrich | |
| 2004/0166886 A1* | 8/2004 | Laroia et al. | 455/522 |
| 2005/0225447 A1 | 10/2005 | Diorio et al. | |
| 2005/0232221 A1 | 10/2005 | Friedrich | |

OTHER PUBLICATIONS

U.S. Appl. No. 11/104,435 Non-final rejection mailed Jul. 6, 2007.
U.S. Appl. No. 11/104,435 Final rejection mailed Jan. 11, 2008.
U.S. Appl. No. 11/104,435 Non-final rejection mailed Jul. 22, 2008.
U.S. Appl. No. 11/104,435 Final rejection mailed Jul. 21, 2009.
U.S. Appl. No. 11/104,435 Advisory action mailed Sep. 30, 2009.
U.S. Appl. No. 11/104,435 Examiner answer to appeal brief mailed Jul. 2, 2010.
U.S. Appl. No. 13/042,146 Non-final rejection mailed Oct. 5, 2011.
U.S. Appl. No. 13/042,146 Final rejection mailed Aug. 22, 2012.
U.S. Appl. No. 13/042,146 Notice of allowance mailed Jun. 10, 2013.

* cited by examiner

METHOD, APPARATUS, AND LOGIC FOR WIRELESS DATA TRANSMISSION

This application is a continuation, under 35 U.S.C. §120, of U.S. patent application Ser. No. 13/042,146, filed Mar. 7, 2011, which is a continuation, under 35 U.S.C. §120, of U.S. patent application Ser. No. 11/104,435, filed 13 Apr. 2005, which claims the benefit, under 35 U.S.C. §119(a), of German Patent Application No. DE 102004019309.6, filed 14 Apr. 2004.

BACKGROUND OF THE INVENTION

1. Field of the Invention

The present invention relates to a method for wireless data transmission between a base station and one or more transponders.

2. Description of the Background Art

Transmission methods between one or more base stations, or readers, and one or more transponders are used in, for example, contactless identification systems or radio frequency identification (RFID) systems. Sensors, for example for temperature measurement, may also be integrated in the transponders. Such transponders are typically also referred to as remote sensors.

Transponders and their transmitting and receiving devices customarily do not have an active transmitter for data transmission to the base station. Such non-active systems are called passive systems if they do not have their own energy supply, and semi-passive systems if they have their own energy supply. Passive transponders take the energy they require for their supply from the electromagnetic field emitted by the base station.

In general, backscatter coupling is used to transmit data from a transponder to the base station using UHF or microwaves in the far field of the base station. To this end, the base station emits electromagnetic carrier waves, which the transmitting and receiving device in the transponder modulates and reflects appropriately for the data to be transmitted to the base station using a modulation method. The typical modulation methods for this purpose are amplitude modulation, phase modulation and amplitude shift keying (ASK) subcarrier modulation, in which the frequency or the phase position of the subcarrier is changed.

In German patent application 102 04 347, and in DE 101 38 217 A1 (which corresponds to U.S. Publication No. 20030133435, and which is incorporated herein by reference), methods for wireless data transmission between a base station and a transponder are described in which data packets to be transmitted comprise a header section, a data section with useful data to be transmitted, and a trailer section. The header section serves to set one or more transmission parameters, in particular, symbols that are found in the header section of the data packet are used for encoding and transmitting the useful data requiring transmission. In this context, a symbol is used to define or interpret the value of a character.

Such a symbol is customarily represented with the aid of a time interval between two sequential symbol delimiters or field gaps, or so-called "notches," in the header section. With amplitude modulation, such a symbol delimiter can be created, for example, by suppressing or blanking the carrier signal. Another option for amplitude modulation is what is called double-sideband modulation having a suppressed carrier, in which the frequency of the carrier signal in the resulting spectrum is suppressed. The transponder decodes received data packets on the basis of the symbols contained in the header section, or using the time periods associated with the symbols, in that it determines the value of a character by comparing its time period with the time periods of the symbols.

The symbol delimiters are typically detected in the transponder using what are known as receiver signal strength indicator (RSSI) circuits. RSSI circuits recognize an attenuation of the field emitted by the base station and then generate a suitable signal for analysis in the transponder. As a result of interference sources in the environment of RFID systems, for example conventional GSM-based mobile radio systems, it is possible for the transponder to incorrectly detect symbol delimiters that were not generated by the base station. Another cause for the occurrence of such interference can be a frequency jump in the electromagnetic field emitted by the base station when a frequency hopping mechanism is used. Motion of the transponder in the environment of the base station can also cause the detection of a symbol delimiter as a result of the prevailing field strength distribution.

When such interference occurs during a data transmission or during a message between the base station and the transponder, the result is generally CRC errors or bit count errors, which communication participants detect in the security layers of the transmission protocol. The communication participants may then repeat the faulty message, for example.

When a symbol delimiter is incorrectly detected outside of a message, the transponder typically interprets this as the start of a message. The transponder then waits for subsequent symbol delimiters in order to process the message. Since no symbol delimiters are transmitted by the base station in this case, a blockage in a receiver unit of the transponder occurs. In order to avoid such blockages, monitoring is performed in the transponder during the data transmission, i.e. at least after the receipt of a first symbol delimiter, to determine whether a time period between two successive symbol delimiters transmitted by the base station exceeds a maximum time or whether no additional symbol delimiters are received within the maximum time. If the maximum time is exceeded, the receiver unit of the transponder is reset. In this way, a blockage or lock-up of the receiver unit resulting from an incorrectly received symbol delimiter is prevented.

The maximum time is typically chosen statically such that worst case conditions are satisfied. To this end, the maximum time is set to a long duration, with the result that a correspondingly long time elapses between the occurrence of interference and the resetting of the receiver unit. Thus, data throughput decreases.

SUMMARY OF THE INVENTION

It is therefore an object of the present invention to provide a method that avoids blockage of the receiver unit in an environment where interference is present and is easy to implement while at the same time ensuring high data throughput between a base station and a transponder.

In the method according to an example embodiment of the invention, a maximum time can be determined in the transponder using at least one symbol of a header section. This permits dynamic adaptation of the maximum time, and thus the possible data throughput, to the transmission conditions prevailing at the moment. The selection of the maximum time need no longer be made based on worst case conditions, but instead can be done adaptively and thus in a manner optimally matched to the transmission conditions.

The maximum time can be determined by multiplying the value of the at least one symbol by a factor. As a result, the maximum time can be set to be larger than the corresponding value or values of the symbols, for example. Consequently, this reduces the transmission time of the header section, since only a fraction of the maximum time needs to be transmitted. Preferably the multiplication is performed by a factor of $2^n$, with n=1, 2, .... Multiplication of this nature is easy to realize through an appropriate shift operation in the transponder.

The maximum time determined can be compared in the transponder to a maximum permissible value, and if this value is exceeded, the time is limited to the maximum permissible value. The effect of, for example, a transmission error during transmission of the symbol or symbols can be minimized in this way. In addition, a standard setting can be forced by this means.

The maximum time can be initialized using a first symbol in the header section, and tracked as a function of one or more subsequent symbols in this header section. This permits reliable monitoring of the time periods between two successive symbol delimiters as soon as the first symbol has been received, while tracking, for example an increase in the maximum time, can take place on the basis of the subsequent symbols. The tracking can also extend across multiple successive data packets.

The at least one symbol can be coded using the period between two successive symbol delimiters of the header section. This permits a coding of the symbol or symbols that is easy to implement and analyze.

The monitoring of whether the maximum time is exceeded by the time period between two successive symbol delimiters transmitted by the base station can be deactivated during specifiable operating phases of the base station and/or transponder, in particular during an asynchronous data transmission. During an asynchronous data transmission, no symbol delimiters are transmitted by the base station. The deactivatable monitoring permits an asynchronous operation or a dynamic switchover between synchronous and asynchronous operation without requiring the receiver unit to be reset as a result of an absence of the symbol delimiter information.

The value of at least one symbol can be stored in the transponder. The at least one symbol can be advantageously stored in the form of a voltage level of a storage capacitor and/or in the form of a count state of a digital counter. This makes it possible to store the value or values of the symbol or symbols in a simple manner, especially when it or they are encoded using the period between two successive symbol delimiters of the header section.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
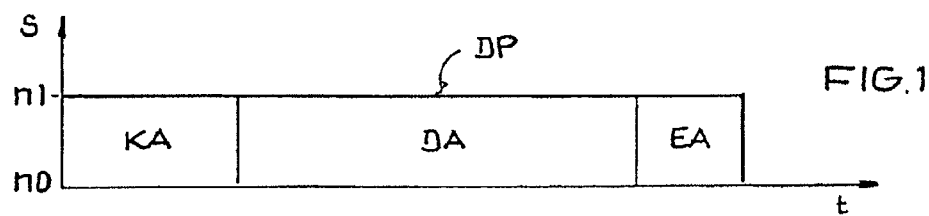
FIG. 1 is a timing diagram of a data packet having a header section, a data section and a trailer section, according to an example embodiment.

FIG. 1 illustrates a data packet DP that is transmitted from a base station to one or more transponders. The data packet includes a header section KA, followed by a data section DA with useful data to be transmitted, and a trailer section EA. To transmit data from the base station to the transponder or transponders, the base station emits electromagnetic carrier waves, on which the data packets DP are modulated. Data transmission from the transponder or transponders to the base station can take place through modulation and backscattering of the electromagnetic carrier waves. The header section can encompass symbols that function to set or control the data transmission between the transponder and the base station.

Figure 2:
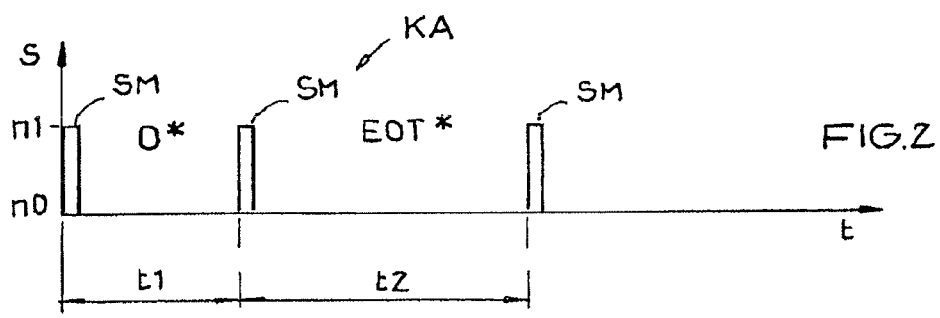
FIG. 2 is a timing diagram of a header section of a data packet, according to an example embodiment.

FIG. 2 shows a diagram of the timing characteristics of the header section KA from FIG. 1 as the output signal of an RSSI circuit of a transponder. The header section KA that is shown contains two symbols 0* and EOT* for the purpose of setting transmission parameters. The symbols 0* and EOT* are represented by the time period between successive symbol delimiters SM, or "notches," in the header section KA, which are produced by modulation of the carrier signal emitted by the base station BS. The symbol delimiters SM are represented in FIG. 2 as short pulses.

The first symbol 0* has a period t1 and the second symbol EOT* has a period t2, where the time periods t1 and t2 are determined by a time measurement unit in the transponder. If the time measurement unit is implemented as a digital counter circuit, the counter values associated with the time periods t1 and t2 are each stored in an associated memory. If the time measurement unit is implemented as an RC circuit, an achieved voltage value is stored in an analog memory in a similar fashion.

The first symbol 0*, or its period t1, is used to code or decode the binary characters "0" or "1" that make up the useful data to be transmitted which is contained in the data section DA of the data packet DP. The symbol EOT* marks the end of a data packet and is transmitted in the trailer section of the data packet, for which purpose any desired signal forms derived from t2 can be used. A binary character in the data section whose period is less than the time period t1 belonging to the symbol 0* is interpreted as a "0" in the transponder TR. A character whose period is greater than t1 and less than the time period t2 belonging to the symbol EOT* is interpreted as a "1". If the time separation between two successive field gaps is greater than t2, the transponder TR detects the end of a data packet.

Figure 3:
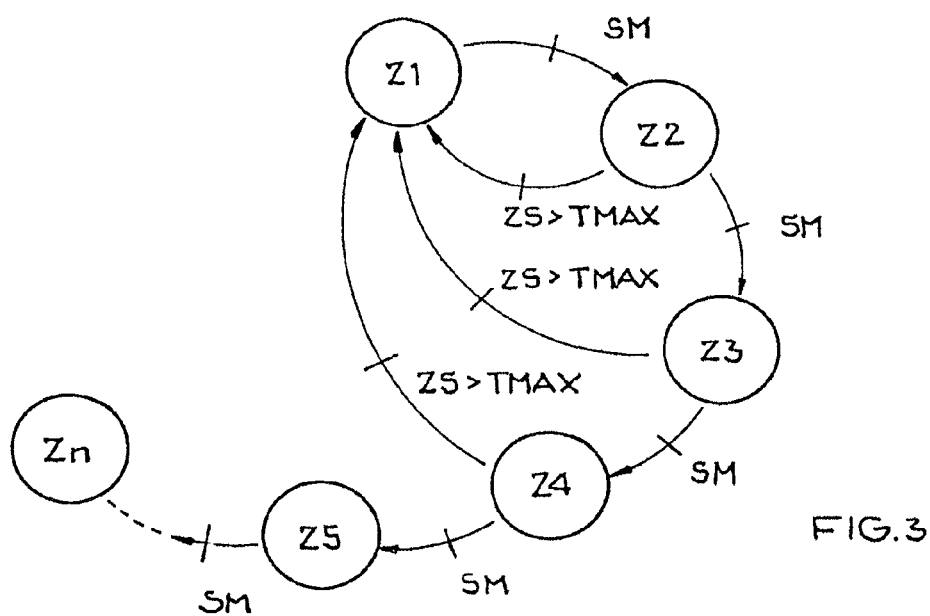
FIG. 3 is a state diagram of a receiver unit of a transponder, according to an example embodiment.

FIG. 3 shows a greatly simplified state diagram of a receiver unit of a transponder. The state diagram shows states Z1 to Z5 and Zn.

The state Z1 represents a base state of the receiver unit of the transponder, in which state the beginning of a data packet DP is awaited. In state Z1, when a symbol delimiter SM is detected, a state change to state Z2 occurs.

In state Z2, the transponder waits to receive the next symbol delimiter SM. Upon receiving the first symbol delimiter SM, a counter is started whose count state ZS corresponds to the elapsed wait time. The count state ZS is continuously compared to a maximum value TMAX, which corresponds to a maximum time or a maximum wait time. When the maximum value TMAX is exceeded, the receiver unit of the transponder is reset, i.e. a state change back to state Z1 takes place. However, in general an exceedance of this nature only takes place when the first symbol delimiter SM was not generated by the base station, but instead was produced by interference. During interference-free transmission of a data packet DP, a resetting of the counter or the count state ZS occurs along with a change to a subsequent state. Upon startup or a power-up reset of the transponder, the maximum value TMAX is initialized to an initial value stored in the memory of the transponder. This initial value is overwritten after the reception of a first data packet DP or after the reception of at least two symbol delimiters SM, i.e. typically starting from state Z3.

When a symbol delimiter SM is received in state Z2 within the maximum time TMAX, a state change to state Z3 takes place. In this context, the count state ZS of the counter represents the time period between the first and the second received symbol delimiters SM, wherein the time period or the associated count state ZS encodes the symbol 0*. The count state ZS is stored in the transponder in a register assigned to the symbol 0*. Moreover, the maximum value TMAX is determined using the symbol 0*, i.e., by multiplying the count state ZS associated with the symbol 0* by a power of two, for example 8. Multiplication by a power of two can be implemented by a simple shift operation. During the state Z3, in turn, the transponder monitors whether the count state ZS exceeds the maximum value TMAX that was determined as described above. In the event that the maximum value TMAX is exceeded, the receiver unit of the transponder is reset, i.e. a state change back to state Z1 takes place.

When a symbol delimiter SM is received in state Z3 within the maximum time TMAX, a state change to state Z4 takes place. The count state ZS of the counter now represents the time period between the second and third received symbol delimiters SM, wherein the time period or the associated count state ZS encodes the symbol EOT*. The count state ZS is stored in the transponder in a register assigned to the symbol EOT*. Moreover, the maximum value TMAX is again determined using the symbol EOT*, i.e., by multiplying the count state ZS associated with the symbol EOT* by a power of two, for example 8. During the state Z4, in turn, the transponder monitors whether the count state ZS exceeds the maximum value TMAX that was determined as described above. In the event that the maximum value TMAX is exceeded, the receiver unit of the transponder is reset, i.e. a state change back to state Z1 takes place.

When a symbol delimiter SM is received in state Z4 within the maximum time TMAX, the header section ends and a state change to state Z5 takes place. In state Z5 as well as in subsequent states Zn, which are not described in detail, the data section DA is received and decoded, and the end of the data packet DP is detected.

In the example embodiment shown, the maximum time TMAX is initialized after a reset of the transponder using a stored value and is then calculated on reception of a first data packet using the symbol 0*, and subsequently using the symbol EOT*, of the header section KA. However, it is also possible to calculate the maximum time on the basis of just one symbol alone, for example 0*. Moreover, it is also possible to introduce another symbol in the header section in order to set the maximum time TMAX. In all cases, the base station can set the maximum time TMAX appropriately for the transmission conditions it detects.

When multiple data packets DP are received, a setting of the maximum time TMAX can take place using only one, for example the first, received data packet DP, or the maximum time TMAX can be calculated anew with each received data packet DP.

The example embodiment clarifies the inventive method using a data transmission from the base station toward the transponder. Naturally, it can also be applied within the scope of a data transmission from the transponder toward the base station when this data transmission is initiated by the base station by transmission of a return link header. In this case, the symbols present in the return link header can be used in the same manner to set the maximum time if the data transmission toward the base station takes place synchronously with the synchronization markers.

If the data transmission from the transponder toward the base station can be dynamically switched over to an asynchronous transmission mode by transmission of control information from the base station to the transponder, there exists the possibility of deactivating a monitoring. This is necessary because in the asynchronous transmission mode, no synchronization markers are generally transmitted by the base station.

The example embodiment shown permits dynamic adaptation of the maximum time TMAX, and thus the possible data throughput, to the transmission conditions prevailing at the moment. The choice of the maximum time TMAX need no longer be made on the basis of worst case conditions, but instead can be made adaptively and thus optimally matched to the transmission conditions.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method comprising:
receiving a data transmission comprising a header with a symbol and at least one symbol delimiter;
monitoring the received data transmission to determine whether a time period between successive symbol delimiters of the header exceeds a maximum time; and
resetting a transponder to an initial state if the time period exceeds the maximum time, the maximum time determined based at least in part on the symbol after receiving successive symbol delimiters.

2. The method of claim 1, further comprising tracking the maximum time as a function of one or more subsequent symbols in the header.

3. The method of claim 1, further comprising decoding the symbol using the time period between successive symbol delimiters.

4. The method of claim 1, further comprising determining the maximum time by multiplying the time period between successive symbol delimiters by a power of two.

5. The method of claim 1, further comprising overwriting the maximum time after receipt of at least two symbol delimiters of the header.

6. The method of claim 1, wherein the monitoring of the time period comprises comparing a count state of a digital counter to the maximum time, the count state corresponding to the time period between successive symbol delimiters.

7. The method of claim 1, wherein the symbol of the header controls the data transmission.

8. A computer-readable non-transitory storage media embodying logic that is configured when executed to:
receive a data transmission comprising a header with a symbol and at least one symbol delimiter;
monitor the received data transmission to determine whether a time period between successive symbol delimiters of the header exceeds a maximum time; and
reset a transponder to an initial state if the time period exceeds the maximum time, the maximum time determined based at least in part on the symbol after receiving successive symbol delimiters.

9. The media of claim 8, wherein the logic is further configured to track the maximum time as a function of one or more subsequent symbols in the header.

10. The media of claim 8, wherein the logic is further configured to decode the symbol using the time period between successive symbol delimiters.

11. The media of claim 8, wherein the logic is further configured to determine the maximum time by multiplying the time period between successive symbol delimiters by a power of two.

12. The media of claim 8, wherein the logic is further configured to overwrite the maximum time after receipt of at least two symbol delimiters of the header.

13. The media of claim 8, wherein the logic is further configured to compare a count state of a digital counter to the maximum time, the count state corresponding to the time period between successive symbol delimiters.

14. The media of claim 8, wherein the symbol of the header controls the data transmission.

15. A circuit configured to:
receive a data transmission comprising a header with a symbol and at least one symbol delimiter;
monitor the received data transmission to determine whether a time period between successive symbol delimiters of the header exceeds a maximum time; and
reset a transponder to an initial state if the time period exceeds the maximum time, the maximum time determined based at least in part on the symbol after receiving successive symbol delimiters.

16. The circuit of claim 15, wherein the circuit is further configured, to track the maximum time as a function of one or more subsequent symbols in the header.

17. The circuit of claim 15, wherein the circuit is further configured to decode the symbol using the time period between successive symbol delimiters.

18. The circuit of claim 15, wherein the circuit is further configured to determine the maximum time by multiplying the time period between successive symbol delimiters by a power of two.

19. The circuit of claim 15, wherein the circuit is further configured to overwrite the maximum time after receipt of at least two symbol delimiters of the header.

20. The circuit of claim 15, wherein the circuit is further configured to compare a count state of a digital counter to the maximum time, the count state corresponding to the time period between successive symbol delimiters.

* * * * *